(12) United States Patent
Nishiyama (10) Patent No.: US 10,877,762 B2
(45) Date of Patent: Dec. 29, 2020

(54) MICROPROCESSOR, POWER SUPPLY CONTROL IC, AND POWER SUPPLY

(71) Applicant: Rohm Co., Ltd., Kyoto (JP)

(72) Inventor: Takahiro Nishiyama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 16/433,115

(22) Filed: Jun. 6, 2019

(65) Prior Publication Data

US 2019/0377579 A1    Dec. 12, 2019

(30) Foreign Application Priority Data

Jun. 8, 2018    (JP) .................................. 2018-110373

(51) Int. Cl.
 *G06F 9/38*    (2018.01)
 *G06F 1/3234*    (2019.01)
 *G06F 13/16*    (2006.01)

(52) U.S. Cl.
 CPC .......... *G06F 9/3812* (2013.01); *G06F 1/3243* (2013.01); *G06F 1/3253* (2013.01); *G06F 13/1605* (2013.01)

(58) Field of Classification Search
 CPC ... G06F 1/3243; G06F 13/1605; G06F 9/3812
 See application file for complete search history.

(56) References Cited

U.S. PATENT DOCUMENTS 5,577,230 A * 11/1996 Argade ................. G06F 9/3812
 711/150
8,860,595 B1 * 10/2014 Fan ....................... H02M 3/157
 341/144

FOREIGN PATENT DOCUMENTS

JP         H08-63354        3/1996

* cited by examiner

*Primary Examiner* — Zachary K Huson
(74) *Attorney, Agent, or Firm* — Fish & Richardson P.C.

(57) ABSTRACT

A microprocessor includes: a first memory bus; a second memory bus; a fetch part configured to fetch an instruction from a first memory connected to the first memory bus; a bus controller configured to control the second memory bus; a determination part configured to determine whether or not an address output from the bus controller is in an area of the first memory; and a first logic circuit part configured to use an output of the determination part to set an access destination of the first memory as the bus controller when the address output from the bus controller is in the area of the first memory.

9 Claims, 10 Drawing Sheets

MICROPROCESSOR, POWER SUPPLY CONTROL IC, AND POWER SUPPLY

CROSS-REFERENCE TO RELATED APPLICATION

This application is based upon and claims the benefit of priority from Japanese Patent Application No. 2018-110373, filed on Jun. 8, 2018, the entire contents of which are incorporated herein by reference.

TECHNICAL FIELD

The present disclosure relates to a microprocessor, a power supply control IC, and a power supply.

BACKGROUND

The memory connection architecture of microprocessors is roughly classified into a von Neumann architecture (hereinafter referred to as a von Neumann type) and a Harvard architecture (hereinafter referred to as a Harvard type).

The von Neumann type has advantages that the circuit scale can be reduced and a program memory and a data memory can be shared because only one memory bus is required. However, the von Neumann type cannot access the program memory and the data memory at the same time, thus hindering improvement in performance (a so-called von Neumann bottleneck).

The Harvard type has an advantage of operating at a higher speed than the von Neumann type because it can access the program memory and the data memory at the same time. However, in the Harvard type, the circuit scale may become large because two memory buses are required and the circuit scale may be further increased by an arbiter or the like if a configuration in the related art is adopted to improve the flexibility of memory usage.

The microprocessor in the related art is either a processor employing the von Neumann type (hereinafter referred to as a von Neumann type processor) or a processor employing the Harvard type (hereinafter referred to as a Harvard type processor). For example, ARM's Cortex-M0/M0+ is a von Neumann type processor, and ARM's Cortex-M3/M4/M7 is a Harvard type processor. Further, in the microprocessor in the related art, circuits cannot be shared between the von Neumann type and the Harvard type.

Here, a method of sharing circuits between the von Neumann type and the Harvard type will be considered. Specifically, a method of applying the Harvard type to the von Neumann type processor and a method of applying the von Neumann type to the Harvard type processor will be considered.

Regarding the method of applying the Harvard type to the von Neumann type processor, it is not possible to apply the Harvard type, which uses two memory buses, to the von Neumann type processor since the von Neumann type processor uses only one memory bus.

As for the method of applying the von Neumann type to the Harvard type processor, it is not possible to apply the von Neumann type to a traditional Harvard type processor since both program and data cannot access the same memory bus in the traditional Harvard processor.

On the other hand, in an improved Harvard type processor including a bus arbitration circuit in the related art, both program and data can access the same memory bus. However, in order to apply the von Neumann type to the Harvard type processor in the related art, it is necessary to modify the bus arbitration circuit (arbitration unit). That is, even when the technique disclosed in the related art is used, circuits cannot be shared between the von Neumann type and the Harvard type.

Further, in the Harvard type processor in the related art, power consumption may be large because two buses are arbitrated in the entire access cycle and the delay of a memory access circuit may be large due to the bus arbitration circuit.

SUMMARY

Some embodiments of the present disclosure provide a microprocessor capable of sharing circuits between the von Neumann type and the Harvard type.

According to an embodiment of the present disclosure, there is provided a microprocessor including: a first memory bus; a second memory bus; a fetch part configured to fetch an instruction from a first memory connected to the first memory bus; a bus controller configured to control the second memory bus; a determination part configured to determine whether or not an address output from the bus controller is in an area of the first memory; and a first logic circuit part configured to use an output of the determination part to set an access destination of the first memory as the bus controller when the address output from the bus controller is in the area of the first memory.

In some embodiments, the microprocessor may further include a second logic circuit part configured to use the output of the determination part to output to the fetch part an inhibition signal that inhibits the fetch part from accessing the first memory in a period where the bus controller is able to access the first memory.

In some embodiments, a state of the fetch part may transition from a fetch state to a prefetch state based on the inhibition signal in the period where the bus controller is able to access the first memory.

In some embodiments, the state of the fetch part may transition to the prefetch state after a counter value and a register value of the fetch part are saved.

In some embodiments, the determination part may include an address decoder configured to output a signal having a logic value that is different between when the address output from the bus controller is in a first range and when the address is in a second range.

In some embodiments, the determination part may include a switching part configured to switch between a first state in which an output signal of the address decoder is the output of the determination part and a second state in which a predetermined logic signal is the output of the determination part.

In some embodiments, write data output from the bus controller may be supplied to the first memory without passing through the first logic circuit part.

In some embodiments, the microprocessor may further include the first memory.

In some embodiments, microprocessor may further include a second memory connected to the second memory bus.

According to another embodiment of the present disclosure, there is provided a power supply control IC including: a controller configured to control a conversion part configured to convert an input voltage into an output voltage; and the microprocessor, wherein the microprocessor defines an operation sequence of the power supply control IC.

According to another embodiment of the present disclosure, there is provided a power supply including: the power supply control IC; and the conversion part.

DETAILED DESCRIPTION

1. Harvard Type Microprocessor

Figure 1:
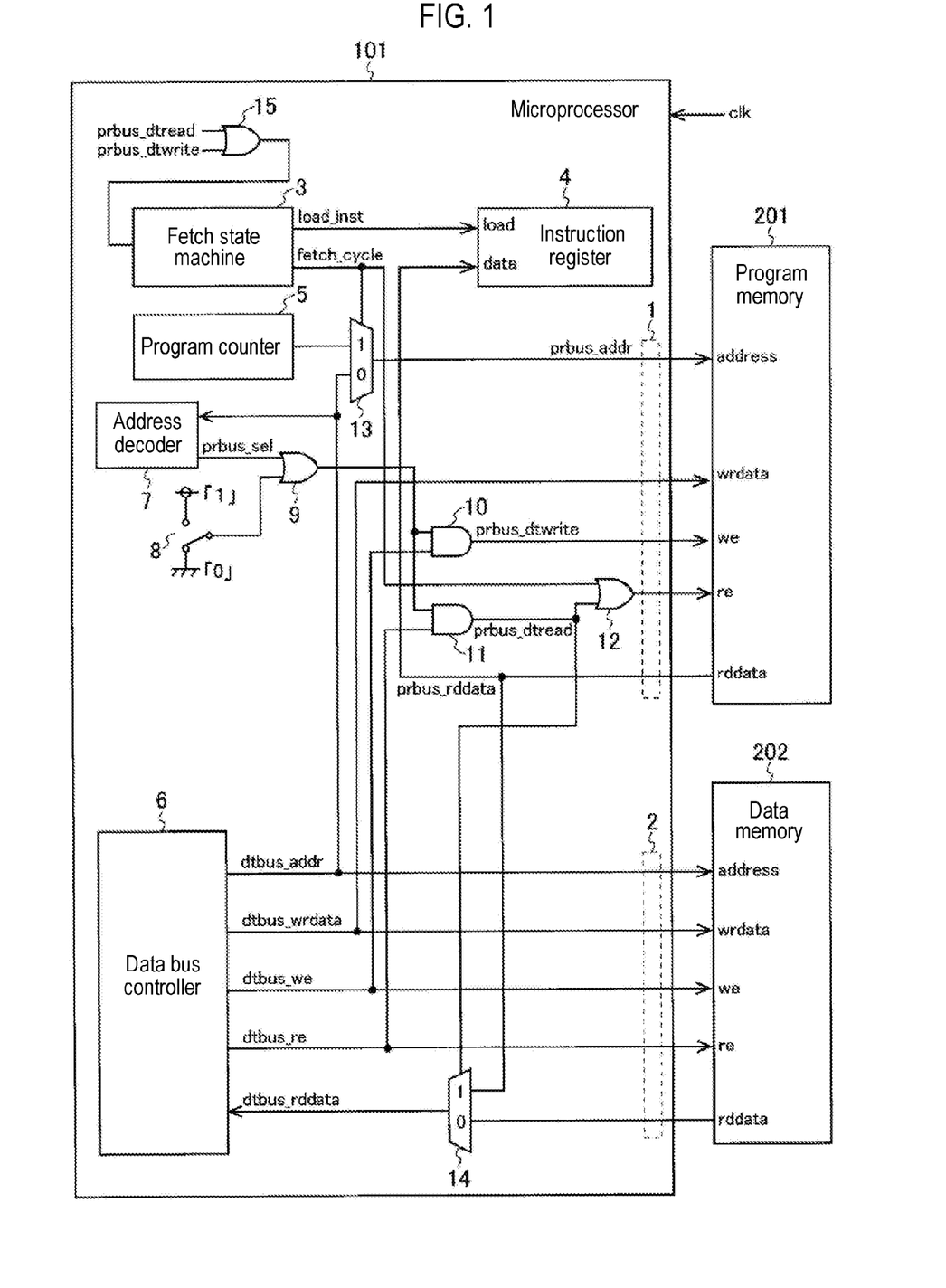
FIG. 1 is a view showing a configuration example of a Harvard type microprocessor.

FIG. 1 is a view showing a configuration example of a Harvard type microprocessor. The Harvard type microprocessor 101 includes a first memory bus 1 and a second memory bus 2. A program memory 201 is connected to the first memory bus 1, and a data memory 202 is connected to the second memory bus 2. Various parts of the Harvard type microprocessor 101 operate in synchronization with a clock signal clk.

One of a nonvolatile memory such as a ROM (Read Only Memory), OTP (One Time Programmable)-ROM or Flash-ROM and a volatile memory such as an SRAM (Static Random Access Memory) or a combination thereof is generally used for the program memory 201. An SRAM is generally used for the data memory 202.

The Harvard type microprocessor 101 further includes a fetch state machine 3, an instruction register 4, a program counter 5 and a data bus controller 6.

A fetch part configured by the fetch state machine 3, the instruction register 4 and the program counter 5 fetches an instruction from the program memory 201. The data bus controller 6 controls the second memory bus 2.

The fetch state machine 3 outputs a fetch execution cycle fetch_cycle and an instruction data load load_inst. The logic of the fetch execution cycle fetch_cycle is "1" when the state of the above-described fetch part is prefetch or when the state of the above-described fetch part is fetch and the next state of the above-described fetch part is also fetch. Otherwise, it is "0." The conditions under which the state of the above-described fetch part becomes prefetch will be described later. The logic of the instruction data load load_inst is "1" when the state of the above-described fetch part is fetch and the next state of the above-described fetch part is also fetch. Otherwise, it is "0."

The instruction register 4 loads data read from the program memory 201 only when the logic of the instruction data load load_inst is "1." The program counter 5 increments and outputs a counter value.

The Harvard type microprocessor 101 further includes an address decoder 7, a switch 8 and an OR gate 9. A determination part configured by the address decoder 7, the switch 8 and the OR gate 9 determines whether or not a data bus address dtbus_addr output from the data bus controller 6 is in an area of a memory connected to the first memory bus 1.

In the present embodiment, a memory map in which the program memory 201 and the data memory 202 are unified is used. In other words, in the present embodiment, there is no overlap between an address range of the program memory 201 and an address range of the data memory 202. Thus, the address decoder 7 can determine whether or not the data bus address dtbus_addr output from the data bus controller 6 is in an area of the program memory 201, based on the data bus address dtbus_addr output from the data bus controller 6.

Figure 2:
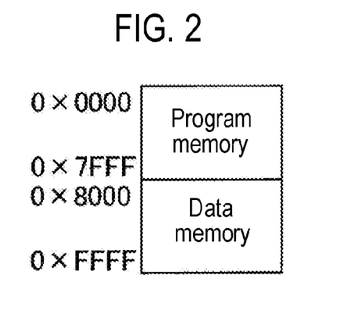
FIG. 2 shows a memory map of a program memory and a data memory.

Further, for example, as shown in FIG. 2, if the address range of the program memory 201 is 0x0000 to 0x7FFF and the address range of the data memory 202 is 0x8000 to 0xFFFF, the address decoder 7 can make the determination based only on the most significant bit of the data bus address dtbus_addr output from the data bus controller 6, thereby allowing reduction in the circuit scale.

If the memory connected to the first memory bus 1 is the program memory 201, the determination result of the address decoder 7 can be used, as it is, as the determination result of the above-described determination part. Thus, in the Harvard type microprocessor 101, the switch 8 selects the logic "0." Then, when the data bus address dtbus_addr output from the data bus controller 6 is in the area of the program memory 201, the logic of a program memory data access signal prbus_sel, which is the determination result of the address decoder 7, is set to "1." Conversely, when the data bus address dtbus_addr output from the data bus controller 6 is not in the area of the program memory 201, the logic of the program memory data access signal prbus_sel, which is the determination result of the address decoder 7, is set to "0."

The Harvard type microprocessor 101 further includes AND gates 10 and 11, an OR gate 12, and selectors 13 and 14. A logic circuit part constituted by the AND gates 10 and 11, the OR gate 12, and the selectors 13 and 14 uses the output of the above-described determination part to set the access destination of the program memory 201 as the data bus controller 6 when the address output from the data bus controller 6 is in the area of the program memory 201.

When the logic of a data bus write enable signal dtbus_we output from the data bus controller 6 is "1" and the logic of the program memory data access signal prbus_sel is "1," that is, when the data bus controller 6 makes a write access to the program memory 201, the AND gate 10 sets the logic of a write access signal prbus_dtwrite to "1" to make the program memory 201 writable.

When the logic of a data bus read enable signal dtbus_re output from the data bus controller 6 is "1" and the logic of the program memory data access signal prbus_sel is "1," that is, when the data bus controller 6 makes a read access to the program memory 201, the AND gate 11 sets the logic of a read access signal prbus_dtread to "1."

When the logic of the fetch execution cycle fetch_cycle is "1" or when the logic of the read access signal prbus_dtread is "1," the OR gate 12 makes the program memory 201 readable.

When the logic of the fetch execution cycle fetch_cycle is "1," the selector 13 outputs a counter value of the program counter 5 to the program memory 201 as an address prbus_addr. On the other hand, when the logic of the fetch execution cycle fetch_cycle is "0," the selector 13 outputs the data bus address dtbus_addr, which is output from the data bus controller 6, to the program memory 201 as the address prbus_addr.

When the logic of the read access signal prbus_dtread is "1," the selector 14 outputs the read data, which is read from the program memory 201, to the data bus controller 6 as data bus read data dtbus_rddata. On the other hand, when the logic of the read access signal prbus_dtread is "0," the selector 14 outputs the read data, which is read from the data memory 202, to the data bus controller 6 as the data bus read data dtbus_rddata.

Since only the data bus controller 6 writes data in the program memory 201, the data bus write data dtbus_wrdata output from the data bus controller 6 is supplied to the program memory 201 without passing through the above-described logic circuit part.

In addition, the data bus address dtbus_addr, data bus write data dtbus_wrdata, data bus write enable signal dtbus_we, and data bus read enable signal dtbus_re output from the data bus controller 6 are supplied to the data memory 202 without passing through the above-described logic circuit part.

The Harvard type microprocessor 101 further includes an OR gate 15. The OR gate 15 uses the output of the above-described determination part to output to the above-described fetch part an inhibition signal for inhibiting the fetch part from accessing the program memory 201 in a period where the data bus controller 6 can access the program memory 201. Specifically, when the logic of the read access signal prbus_dtread or the logic of the write access signal prbus_dtwrite is "1," that is, when the data bus controller 6 accesses the program memory 201, the OR gate 15 outputs the above-described inhibition signal (a signal of logic "1") to the fetch state machine 3. Upon receiving the above-described inhibition signal, the fetch state machine 3 transitions the state of the above-described fetch part from the fetch state to the prefetch state. As such, the access destination of the program memory 201 can be distributed to the above-described fetch part and data bus controller 6 without using a bus arbitration circuit.

Figure 3:
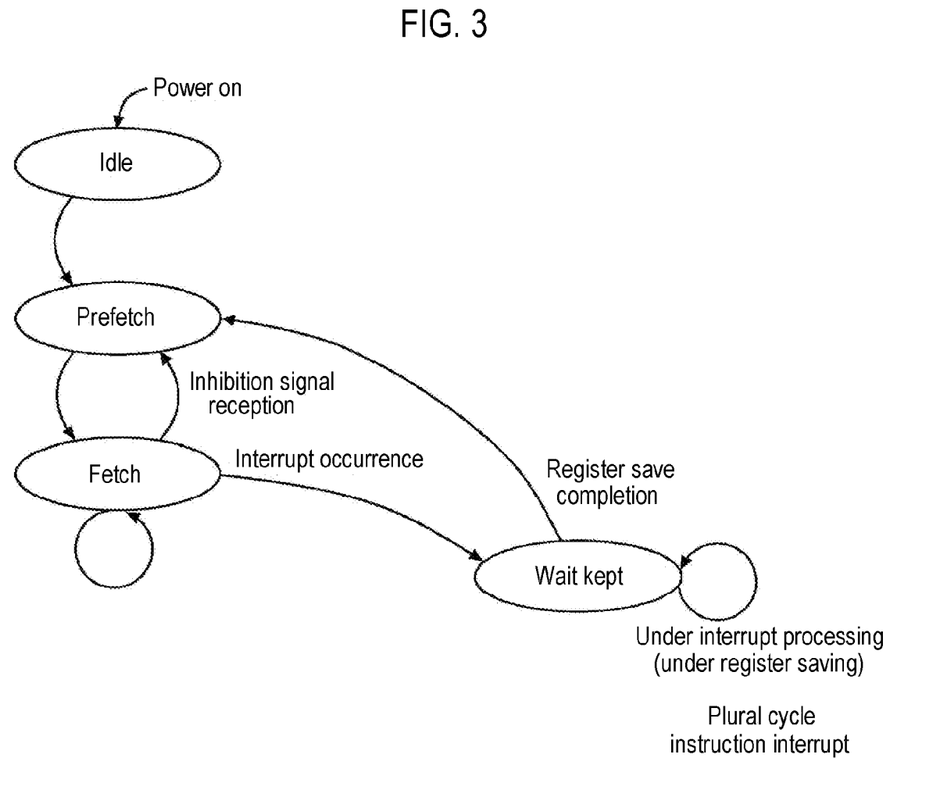
FIG. 3 is a view showing state transition of a fetch part.

FIG. 3 is a view showing the state transition of the above-described fetch part. When the microprocessor is powered on, the above-described fetch part passes through an idle state and accesses the program memory 201 in the prefetch state. Then, the above-described fetch part enters the fetch state from the next cycle (clock cycle), fetches the data read from the program memory 201 into the instruction register 4, and continues executing the instruction. Then, upon receiving the inhibition signal, the fetch state machine 3 transitions the state of the above-described fetch part from the fetch state to the prefetch state. The occurrence of an interrupt will be described later.

Figure 4:
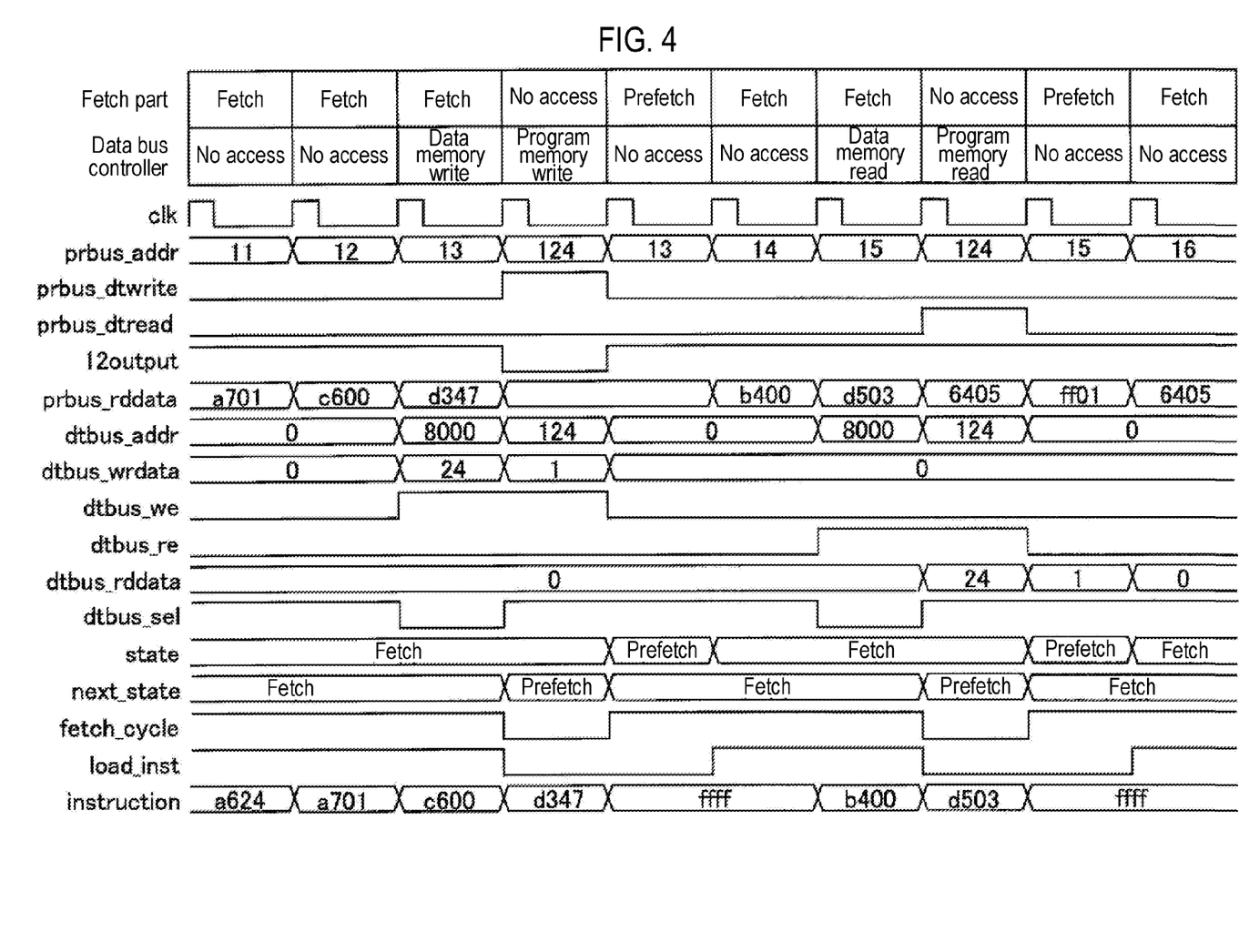
FIG. 4 is a timing chart showing signals of various parts.

As can be seen from FIG. 4, when the logic of the read access signal prbus_dtread or the logic of the write access signal prbus_dtwrite is "1," the state of the above-described fetch part transitions to the prefetch state and the data bus controller 6 accesses the program memory 201 in the period of the prefetch state. Thus, the access destination of the program memory 201 can be distributed to the above-described fetch part and data bus controller 6 without using a bus arbitration circuit. In FIG. 4, "12output" means an output signal of the OR gate 12, and "ffff" in "instruction" means that no instruction is executed.

2. von Neumann Microprocessor

Figure 5:
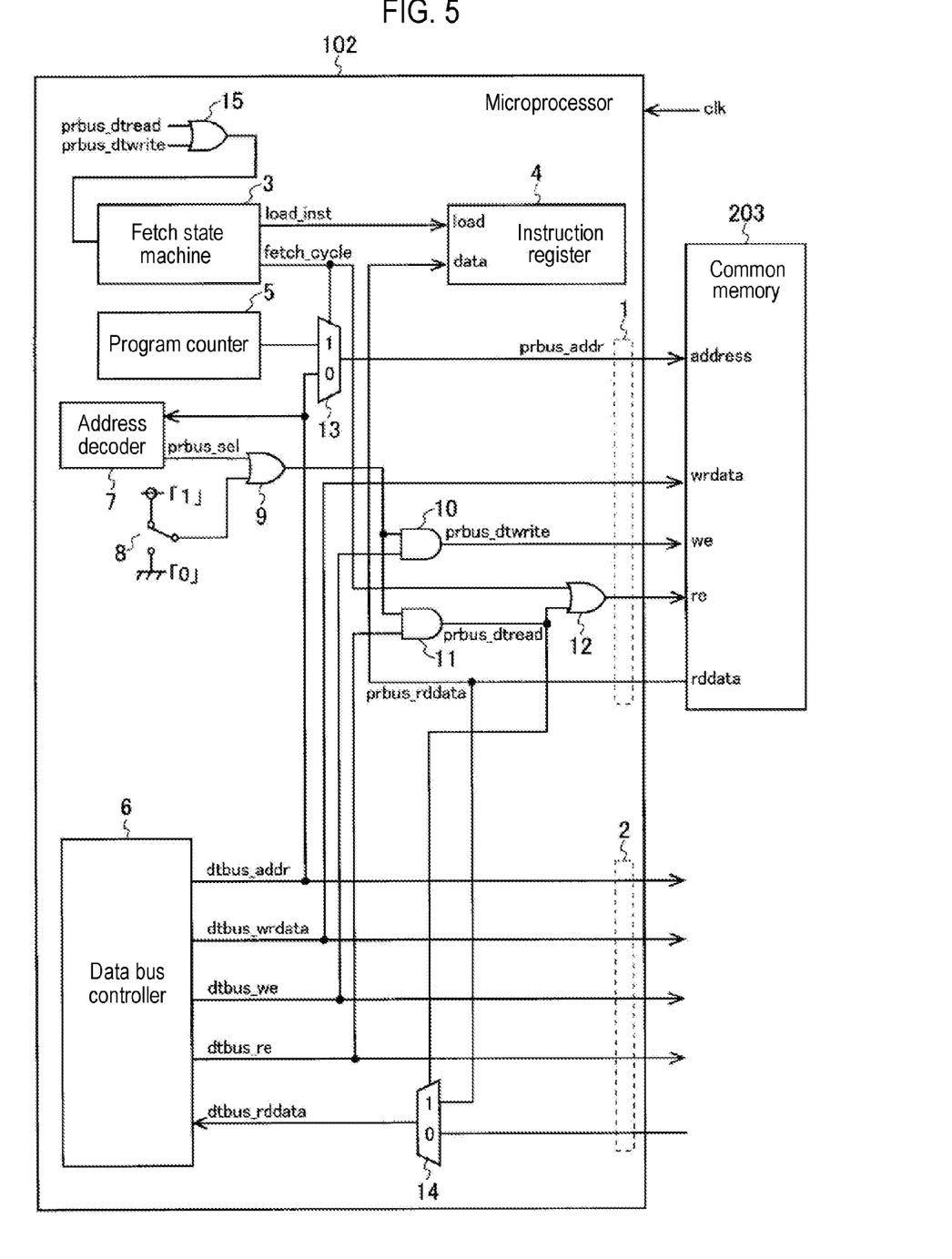
FIG. 5 is a view showing a configuration example of a von Neumann type microprocessor.

FIG. 5 is a view showing an example of the configuration of a von Neumann microprocessor. The von Neumann microprocessor 102 has the same circuit configuration as the Harvard type microprocessor 101 and differs from the Harvard type microprocessor 101 in only the selected state of the switch 8. In the von Neumann microprocessor 102, the switch 8 selects logic "1."

Figure 6:
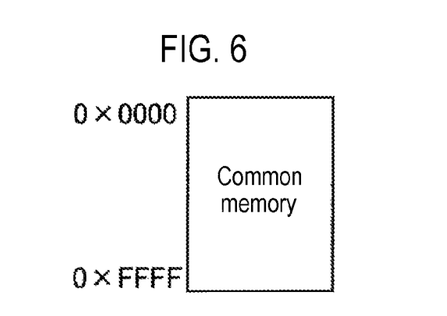
FIG. 6 shows a memory map of a common memory.
Figure 7:
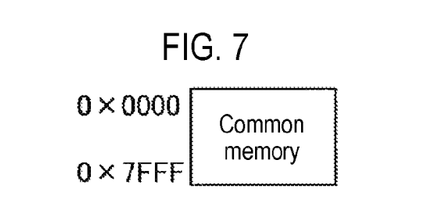
FIG. 7 is a view showing another memory map of the common memory.

A common memory 203 is connected to the first memory bus 1 of the von Neumann microprocessor 102, and no memory is connected to the second memory bus 2 of the von Neumann microprocessor 102. The address range of the common memory 203 may be, for example, 0x0000 to 0xFFFF as shown in FIG. 6. On the other hand, if the address range of the common memory 203 is, for example, 0x0000 to 0x7FFF as shown in FIG. 7 and the entire address range of the common memory 203 is set to be included in the address range of the program memory 201, the switch 8 and the OR gate 9 can be removed.

3. Advantages

For example, if priority is given to performance, the Harvard type microprocessor 101 can be selected, and if the chip area is to be reduced, the von Neumann microprocessor 102 can be selected. Further, since the Harvard type microprocessor 101 and the von Neumann microprocessor 102 have the common circuit configuration, the Harvard type microprocessor 101 and the von Neumann microprocessor 102 can be operated with the same source code. That is, the development environments of the Harvard type microprocessor 101 and the von Neumann microprocessor 102 can be shared.

Since the Harvard type microprocessor 101 and the von Neumann microprocessor 102 do not perform bus arbitration, there is neither an increase in power consumption nor an increase in delay of the memory access circuit due to bus arbitration.

The Harvard type microprocessor 101 shown in FIG. 1 is configured to be connected to the external program memory 201 and data memory 202. However, the program memory 201 and the data memory 202 may be incorporated in the Harvard type microprocessor 101, as in a Harvard type microprocessor 103 shown in FIG. 8. Similarly, although the von Neumann microprocessor 102 shown in FIG. 5 is configured to be connected to the external common memory 203, it may incorporate the common memory 203, as in a von Neumann microprocessor 104 shown in FIG. 9.

Figure 8:
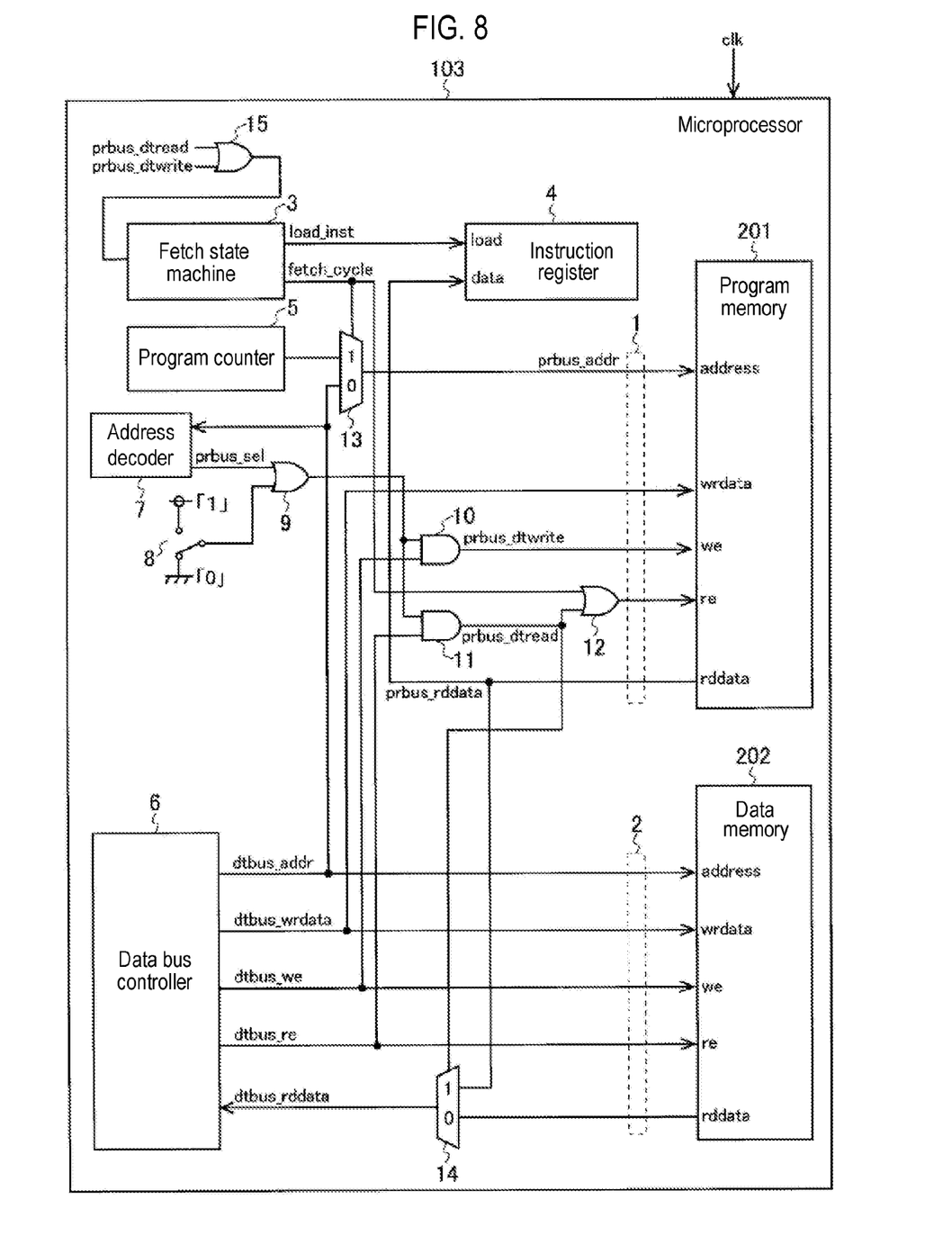
FIG. 8 is a view showing another configuration example of the Harvard type microprocessor.
Figure 9:
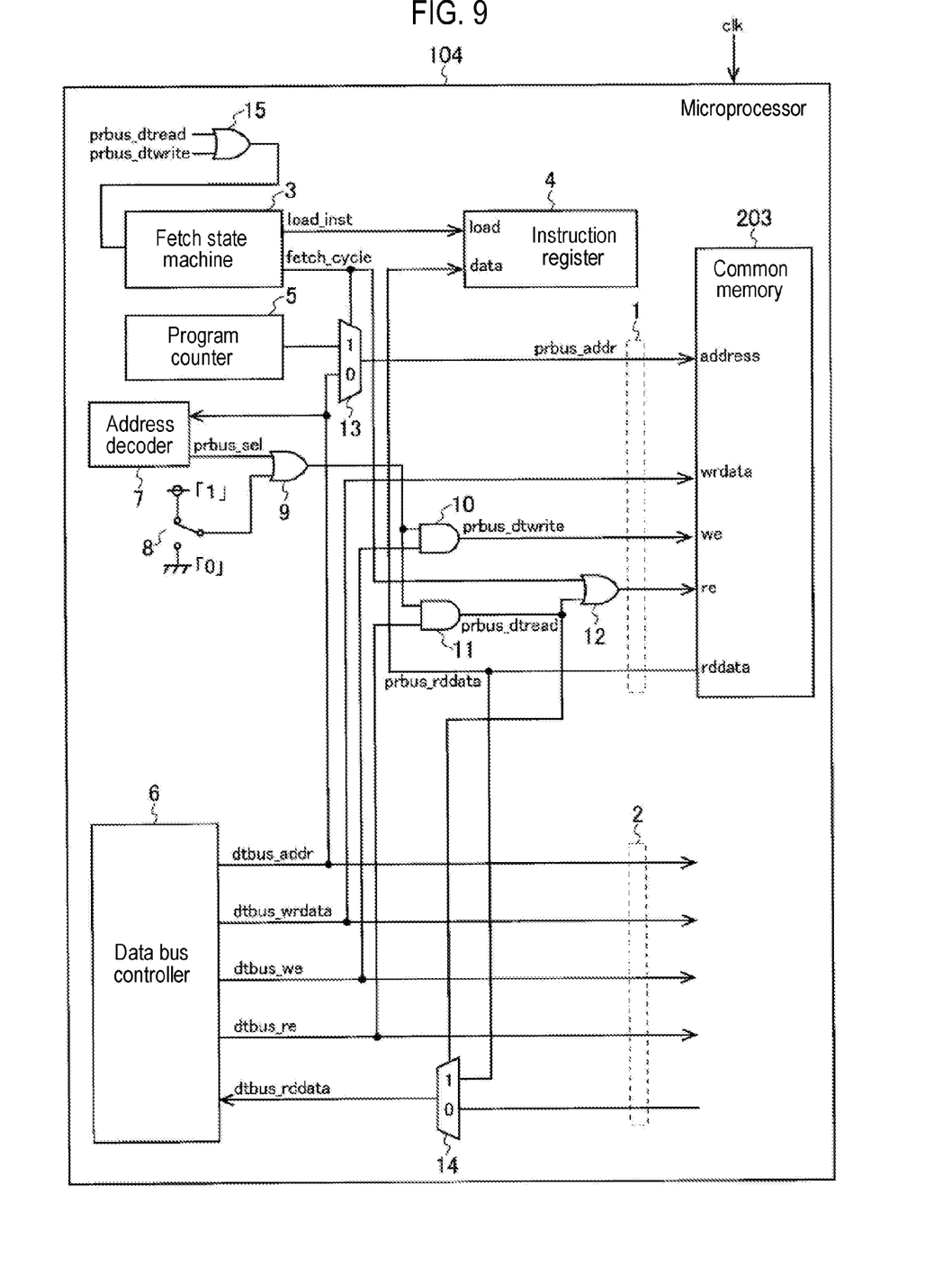
FIG. 9 is a view showing another configuration example of the von Neumann type microprocessor.

Even in a microprocessor with a built-in memory as shown in FIGS. 8 and 9, development environments can be shared by sharing circuits in parts other than the memory between the von Neumann type and the Harvard type.

4. Interrupt Latency

When an interrupt occurs, interrupt latency occurs. Here, the interrupt latency refers to a time from an occurrence of an interrupt to a start of execution of an interrupt routine. By matching the interrupt latency between the Harvard type microprocessor 101 and the von Neumann microprocessor 102, the development environments of the Harvard type microprocessor 101 and the von Neumann microprocessor 102 can be further shared.

Figure 10:
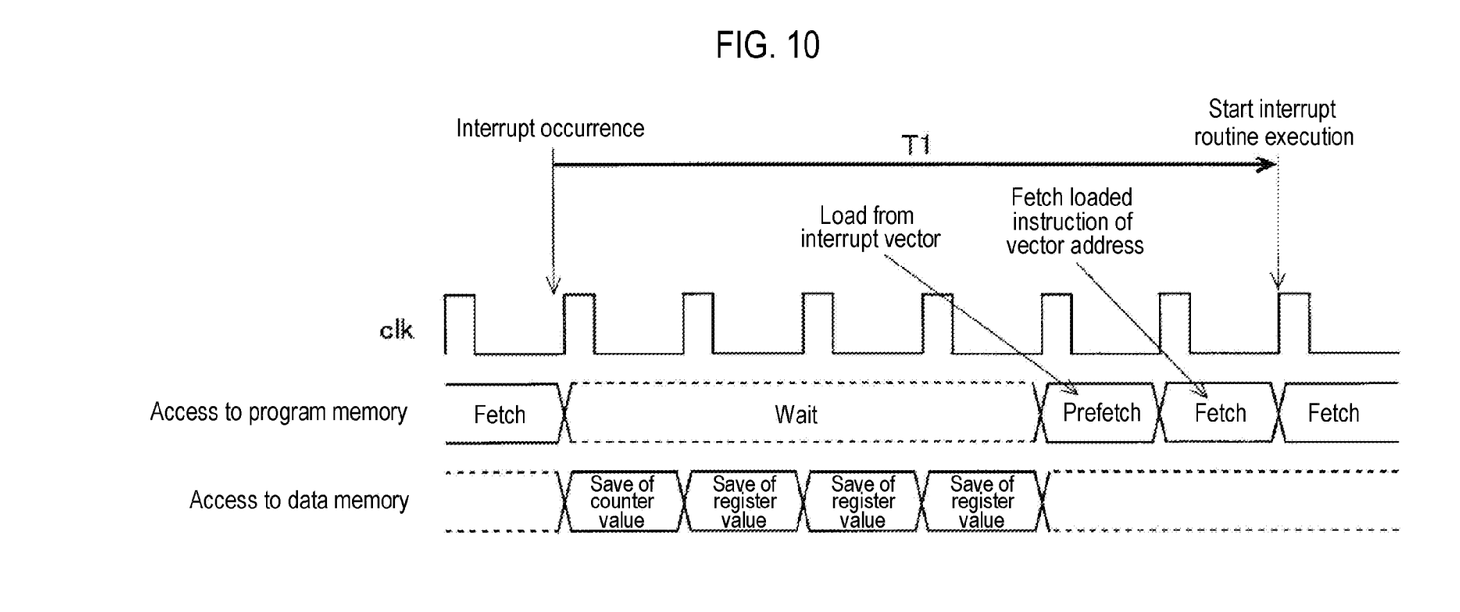
FIG. 10 is a timing chart showing an operation of the Harvard type microprocessor when an interrupt occurs.
Figure 11:
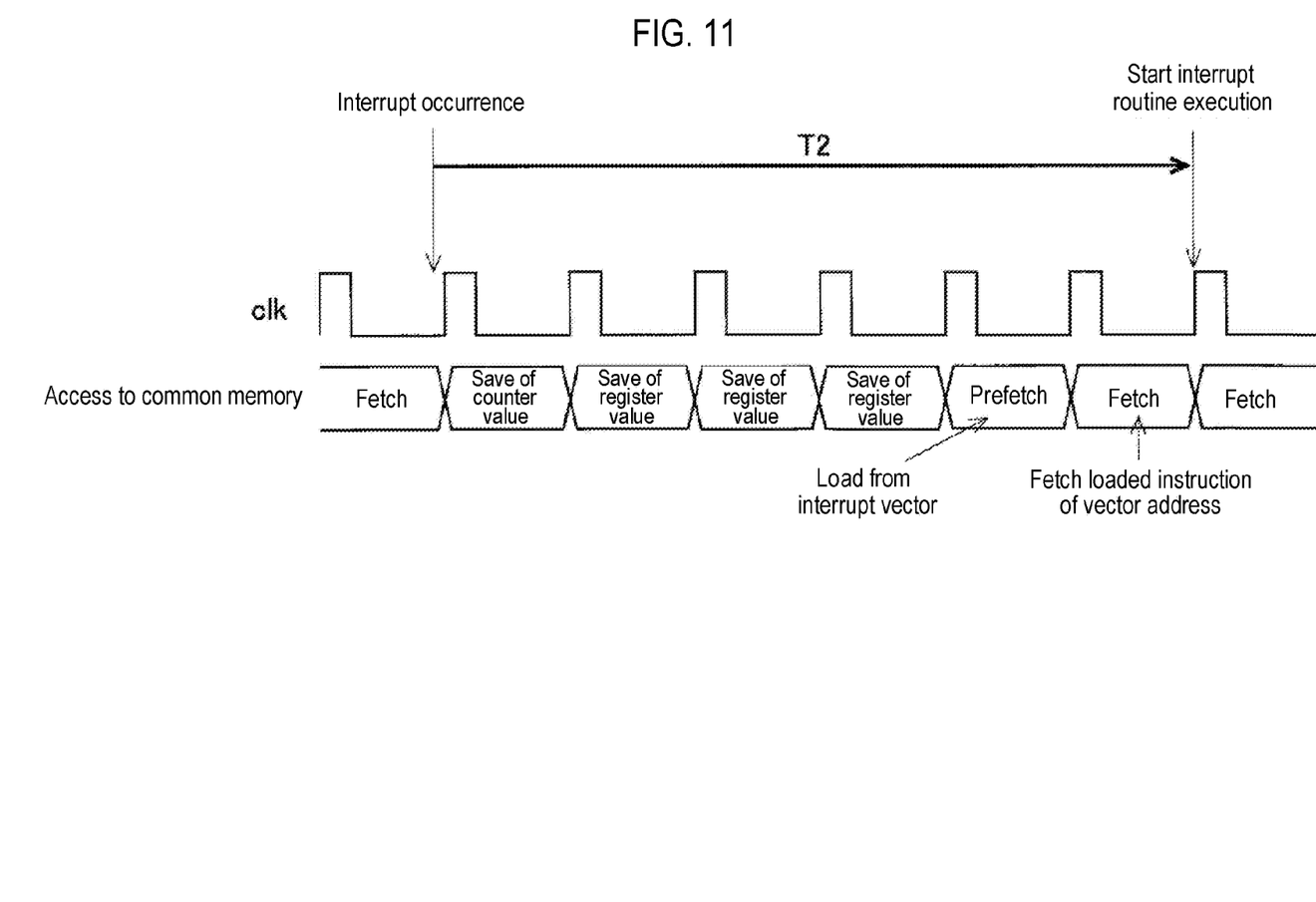
FIG. 11 is a timing chart showing an operation of the von Neumann type microprocessor when an interrupt occurs.

Therefore, in the present embodiment, when an interrupt occurs in the fetch state, the state transitions from the fetch state to a wait state as shown in FIG. 3, and the wait state is maintained (kept) until save of the register is completed. When the register save is completed, the state transitions from the kept wait state to the prefetch state. Therefore, in the Harvard type microprocessor 101 of the present embodiment, as shown in FIG. 10, the state of the fetch part transitions from the wait state to the prefetch state after the save of a counter value of the program counter 5 and the save of a register value of the instruction register 4 are completed. In the prefetch state, the instruction register 4 loads an instruction from an interrupt vector, and the loaded instruction at the vector address is fetched from the program memory 201 in the fetch state. Therefore, access to the program memory 201 and access to the data memory 202 do not occur simultaneously after an interrupt occurs. As a result, the interrupt latency T1 of the Harvard type microprocessor 101 shown in FIG. 10 matches the interrupt latency T2 of the von Neumann microprocessor 102 shown in FIG. 11.

5. Applications

Figure 12:
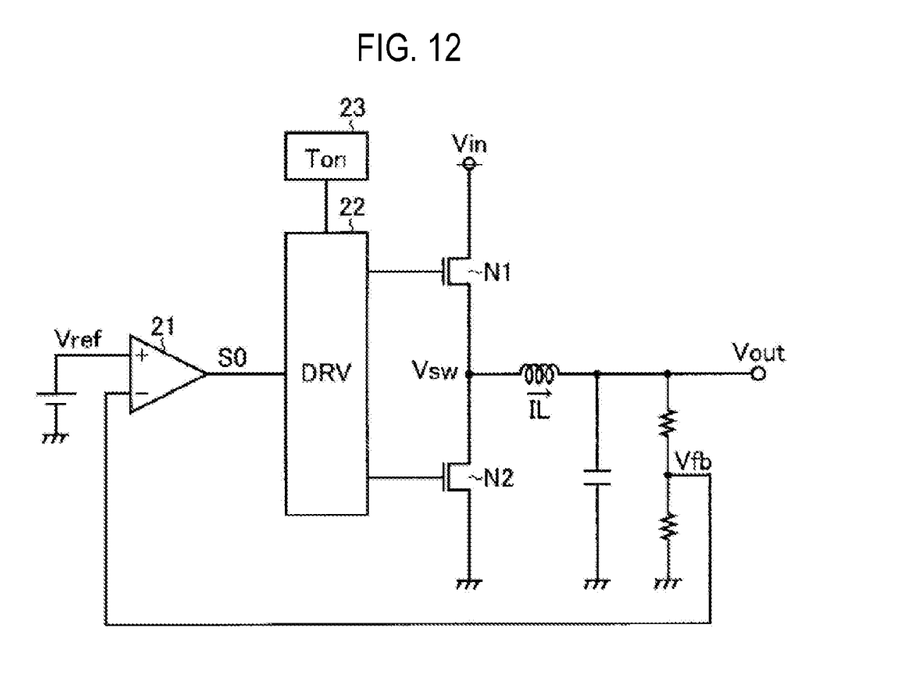
FIG. 12 is a view showing a configuration example of a bottom detection on-time fixed switching power supply.

The microprocessors 101 to 104 described above can be used, for example, in a bottom detection on-time fixed switching power supply shown in FIG. 12. The bottom detection on-time fixed switching power supply shown in FIG. 12 is a step-down DC/DC converter that steps down the input voltage Vin to generate a desired output voltage Vout.

In the bottom detection on-time fixed switching power supply shown in FIG. 12, when a comparator 21 detects that a feedback voltage Vfb has dropped to a reference voltage Vref, a driver 22 turns on an upper transistor N1 so that a switch voltage Vsw is at a high level only for a predetermined on-time Ton, based on an output from an on-time setting circuit 23 that sets the predetermined on-time Ton. The driver 22 turns off the upper transistor N1 except for the predetermined on-time Ton. The upper transistor N1 and a lower transistor N2 are complementarily switched by the driver 22.

Further, in the bottom detection on-time fixed switching power supply shown in FIG. 12, the driver 22 executes an operation according to an output of a current sensor, a temperature sensor or the like in order to realize an overcurrent protection function, an overheat protection function, or the like.

The driver 22 is a power supply control circuit that controls the state of the bottom detection on-time fixed switching power supply, and any one of the microprocessors 101 to 104 described above may be used as at least a part of the driver 22.

The microprocessors 101 to 104 described above may also be used for power supplies other than the bottom detection on-time fixed switching power supply. Further, the microprocessors 101 to 104 described above may be used not only to control the power supply but also to control, for example, states of various sensors or to control a state of a light emitting element driving device for driving light emitting elements.

6. Others

In addition to the embodiment described above, various modifications can be made to the configuration of the present disclosure without departing from the spirit and scope of the present disclosure.

For example, the switch 8 may be installed outside the microprocessor, and a logic signal output from the switch 8 may be externally input to the microprocessor. In addition, for example, instead of using the switch 8 which is hardware, by setting a bit at the beginning of a program, a logic signal of "0" in the case of Harvard type and a logic signal of "1" in the case of von Neumann in software may be supplied to the OR gate 9. Further, for example, the switch 8 may be a switch (for example, a switch using a trimming element) whose selection cannot be changed after the selection is performed once.

According to the present disclosure in some embodiments, the microprocessor can share circuits between the von Neumann type and the Harvard type.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A microprocessor comprising:
 a first memory bus;
 a second memory bus;
 a fetch part configured to fetch an instruction from a first memory connected to the first memory bus;
 a bus controller configured to control the second memory bus;
 a determination part configured to determine whether or not an address output from the bus controller is in an area of the first memory;
 a first logic circuit part configured to use an output of the determination part to set an access destination of the first memory as the bus controller when the address output from the bus controller is in the area of the first memory, and
 a second logic circuit part configured to use the output of the determination part to output to the fetch part an inhibition signal that inhibits the fetch part from accessing the first memory in a period where the bus controller is able to access the first memory,
 wherein a state of the fetch part transitions from a fetch state to a prefetch state based on the inhibition signal in the period where the bus controller is able to access the first memory.

2. The microprocessor of claim 1, wherein the state of the fetch part transitions to the prefetch state after a counter value and a register value of the fetch part are saved.

3. The microprocessor of claim 1, wherein the determination part includes an address decoder configured to output a signal having a logic value that is different between when the address output from the bus controller is in a first range and when the address is in a second range.

4. The microprocessor of claim 3, wherein the determination part includes a switching part configured to switch between a first state in which an output signal of the address decoder is the output of the determination part and a second state in which a predetermined logic signal is the output of the determination part.

5. The microprocessor of claim 1, wherein write data output from the bus controller is supplied to the first memory without passing through the first logic circuit part.

6. The microprocessor of claim 1, further comprising the first memory.

7. The microprocessor of claim 6, further comprising a second memory connected to the second memory bus.

8. A power supply control IC comprising:
a controller configured to control a conversion part configured to convert an input voltage into an output voltage; and
the microprocessor of claim 1,
wherein the microprocessor defines an operation sequence of the power supply control IC.

9. A power supply comprising:
the power supply control IC of claim 8; and
the conversion part.

* * * * *